June 21, 1960  J T. BLAIR ET AL  2,941,762
FUEL CELL
Filed April 23, 1958
2 Sheets-Sheet 1

INVENTORS.
J THOMAS BLAIR
BY ROBERT S. ROSS
ROGER L. WOLCOTT
*H.H. Oldham*
ATTORNEY

United States Patent Office 2,941,762
Patented June 21, 1960

2,941,762
FUEL CELL

J Thomas Blair, Akron, Robert S. Ross, Cleveland, and Roger L. Wolcott, Atwater, Ohio, assignors to Goodyear Aircraft Corporation, Akron, Ohio, a corporation of Delaware Filed Apr. 23, 1958, Ser. No. 730,322

3 Claims. (Cl. 244—135)

This invention relates generally to an apparatus for supplying fuel under pressure to an airplane engine and more particularly to a pressurized flexible fuel cell utilized in an airplane which is at least in part of inflatable construction.

In the copending application of Bruce K. Bain et al., Serial #564,693, filed February 10, 1956, an airplane is described having the major components thereof of inflatable construction. Inasmuch as one major advantage of an inflatable airplane is the ease of transportation in deflated condition and the overall weight reduction achieved, it is of primary importance that auxiliary equipment be simplified whenever possible. It is to the problem of elimination of a fuel pump and a rigid fuel tank of such airplane that this invention is directed.

The general object of the invention is therefore to reduce bulk and weight of an inflatable airplane.

A further object of the invention is to eliminate the conventional pumping mechanism to supply fuel under pressure to the engine of an airplane, etc.

Other objects and advantages of this invention will become apparent hereinafter as the description proceeds; the novel features, arrangements, and combinations being clearly delineated in the specification, as well as in the claims, hereunto appended.

Figure 1:
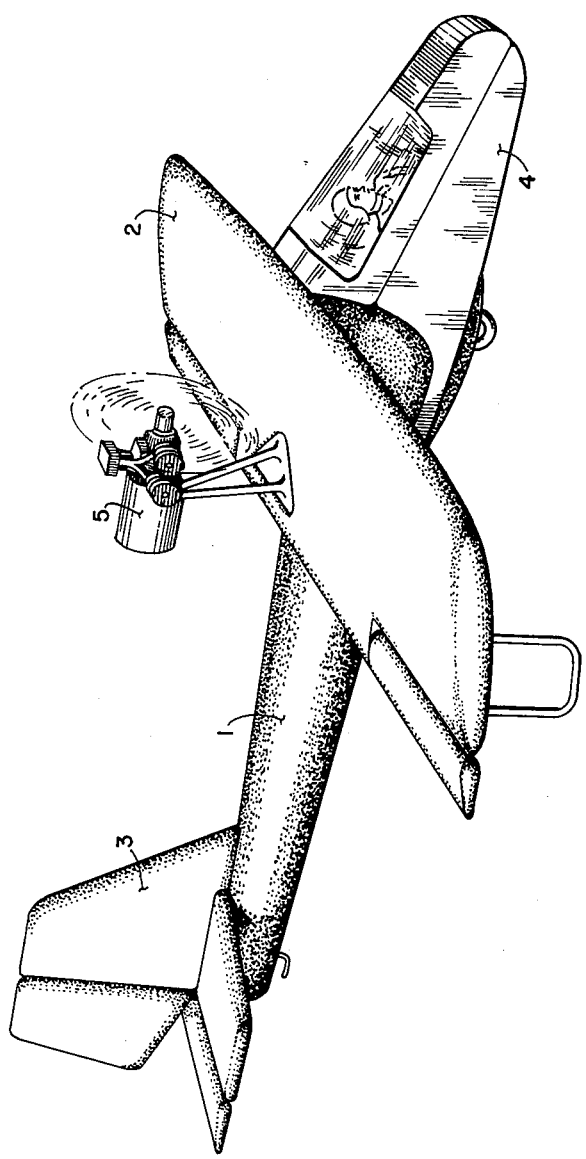
Fig. 1 is a perspective view of an inflatable airplane.

In Fig. 1 is shown an inflatable airplane wherein the fuselage 1 consists of a tubular structure of reinforced airtight rubberized fabric formed into extended tapered cylindrical form and inflated by internal pressure to a substantial rigidity. A wing 2, an empennage 3, and a pilot's enclosure 4, are shown and are constructed of inflatable panels of the general type such as are shown and described in detail in U.S. Patent 2,743,510 issued to Mauney et al., on May 1, 1956, entitled "Inflatable Fabric Segment of Curved Configuration and the Method of Making the Same." Briefly this construction consists of parallel spaced rubberized fabric panels interconnected with a multiplicity of threads normal to the face of each panel and connecting opposing panel portions across the space therebetween. The result is a rigid flat inflatable panel.

The airplane prime mover is shown as a small internal combustion engine 5 suitably mounted on the upper surface of the wing 2. Inasmuch as this invention is only concerned with the apparatus for supplying pressurized fuel to the engine 5, the constructional details of the above-described components, engine mountings, controls, and the like will not be further described; the above general description being sufficient to achieve a proper framework for understanding the relationship of the fuel cell of the invention to the general airplane configuration.

Figure 2:
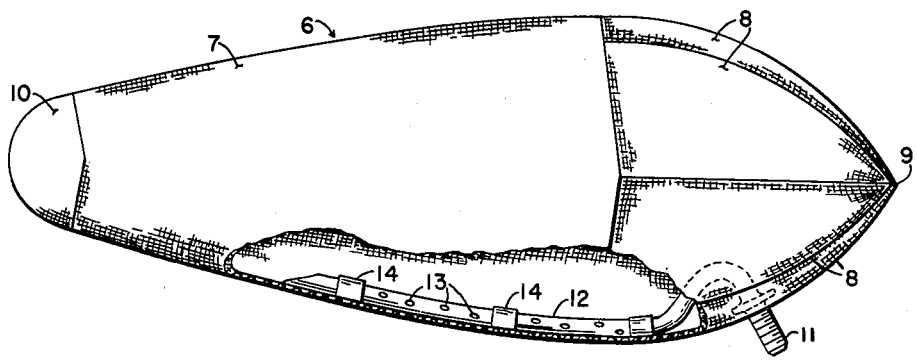
Fig. 2 is a side view of the fuel cell of the invention.
Figure 3:
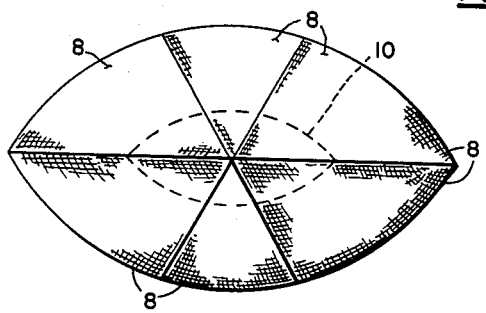
Fig. 3 is an end view of the fuel cell of the invention.

In Figs. 2 and 3 is shown a fuel cell generally designated by the numeral 6 and having an overall configuration of an enlarged center portion which tapers inwardly to both ends. The fuel cell 6 is constructed of coated fabric segments suitably joined, for example, by an adhesive. A center portion 7 is formed into a generally tapering conical flattened ellipsoid shape having segmented triangular fabric pieces or gores 8 at one end joined to form a pointed apex 9 and a generally flattened hemispherical fabric piece 10 at the other end. As will be apparent, internal baffles may be provided to prevent liquid "sloshing" where undesirable.

A fitting 11 projects through the fuel cell wall through one of the gores 8 to provide access to the cell cavity. An internal flexible hose 12 is attached at one end to the wall fitting 11 and lies along the bottom of the fuel cell with the other end of the hose 12 being open to the fuel cell cavity. Along the length of the hose 12, perforations 13 are provided to further aid in filling or removing the fuel. At appropriately spaced intervals along the length of the hose 12, fastener hoops 14 are shown to retain the hose 12 in position within the cell 6. Such hoops may be simply fabric pieces suitably attached to the interior side of the cell 6. As will be later more fully understood, the cell construction is such that the entire cell can be collapsed to substantially zero effective volume; the coated fabric walls being of sufficient flexibility as to permit of such contraction.

The fuel cell 6 can be constructed of any suitable coated fabric materials that are fuel-impervious and fuel-resistant; such materials being well known in the art of airplane fuel cells and an example thereof being fabric made of material such as nylon, coated with a fuel-resistant synthetic rubber.

Figure 4:
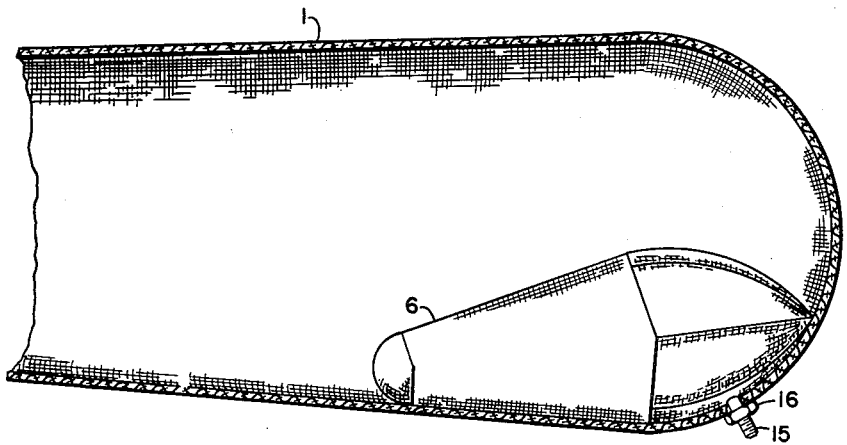
Fig. 4 is a fragmentary cross-sectional view showing the fuel cell of the invention in position within an inflatable component.

Fig. 4 illustrates the placement of the fuel cell 6 with relation to the fuselage 1 of the airplane. The end of the fuselage shown is the forward end of the fuselage approximately below the wing 2 of Fig. 1. The fuel cell 6 is placed to lie along the lower part of the fuselage 1 and is generally symmetrically aligned with the longitudinal axis of the fuselage shape to minimize listing of the airplane. Preferably the cross-sectional configuration of the fuel cell 6 is such that the lower half thereof lies in intimate contact with the interior surface of the fuselage wall; hence the flattened cross-sectional shape shown clearly in Fig. 3. Furthermore, it will be understood that the fuel cell can be placed within other inflatable airplane components, if such are available, such as wings, empennage, and the like.

Figure 5:
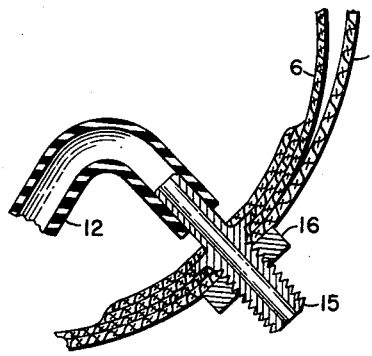
Fig. 5 is a fragmentary cross-sectional view of the filling and outlet pipe of the fuel cell of the invention.

Although means for attaching the fuel cell 6 along its entire length may be provided, sufficient affixing is had by the penetration of the fitting 11 of Fig. 2 through an appropriate opening in the fuselage wall. As can be seen in Figs. 4 and 5, a rigid nipple 15 is permanently attached to the wall of the fuel cell 6 and extends inwardly and outwardly thereof. The outward extension is externally threaded to receive a nut 16 thereon to secure the fuel cell at this point sealingly to the fuselage 6. Such outward extension is also adapted to receive a supply line leading to the carburetor of the engine 5 to supply fuel thereto. Such supply line may have provision thereon for filling the fuel cell 6. The details of the supply line and carburetor system are not shown in the interests of simplicity and clarity and are well known in the art. The inward extension of the nipple 15 is suitably joined to the internal distribution hose 12 previously described in detail in connection with Fig. 2.

In operation, the airplane is assumed to have been inflated and ready for fueling. Referring to Fig. 4, the cavity of the fuselage 1 is under a positive pressure, and, since at this point of the description, the fuel cell 6 is presumed empty of fuel, the cell 6 is in collapsed state and at substantially zero effective volume when the nipple 15 is open to atmospheric pressure. To fill the cell 6, the fuel is introduced through the nipple 15 under pressure until a puredetermined metered amount of fuel is present within the cell 6. In view of the positive pressure existing within the fuselage 1, it will now be apparent that a positive fuel pressure will be present at the carburetor intake when the nipple 15 is properly valved to the carburetor supply line. Furthermore, as fuel is consumed in flight, the cell wall 6 will collapse proportionally to always maintain a firm positive fuel supply pressure to the carburetor.

It will be apparent at this point in the description, that a suitably shaped fuel cell of collapsible form as described may be utilized in portions of the airplane other than the fuselage. For example, since the wing, empennage, and pilot's enclosure are in effect pressurized chambers, provisions for a fuel cell therein, oriented in position to effect the fuel pressurizing action hereabove described may be made in lieu of the fuselage embodiment described, or in addition thereto.

Thus, by the construction of the invention described, the objects of the invention are achieved in that the conventional gravity feed or mechanical fuel pump for supplying fuel to the carburetor under pressure is eliminated and the overall characteristics of an inflatable airplane, such as bulkiness when collapsed, are considerably enhanced.

While certain representative embodiments and details have been shown for the purpose of illustrating the invention, it will be apparent to those skilled in this art that various changes and modifications may be made therein without departing from the spirit or scope of the invention.

We claim:
1. In an airplane having a flexible-walled fuselage capable of sustained inflation by pressurization, air under pressure inflating said fuselage, a completely self-contained, fuel-tight flexible-walled, collapsible container internally defining a fuel-storage space totally contained within said fuselage, said container having a portion of the exterior surface thereof contacting with and conforming to a portion of the internal surface of the fuselage and the remaining exterior surface thereof directly exposed to the internal pressure within the fuselage in the inflated state, said container being positioned substantially at the center of gravity of the airplane, and conduit means communicating between the fuel storage space and the outer surface of the fuselage.

2. In an airplane having a major component thereof of flexible inflatable construction, a pressurized fuel supply comprising a completely enclosed, fuel-tight flexible-walled collapsible container internally defining a fuel-storage space, said container being positioned completely within said component and having a portion of the exterior surface of the container contacting with and conforming to a portion of the internal surface of said component and the remaining exterior surface thereof exposed to the internal pressure within said component in the inflated state, and conduit means communicating between the fuel storage space and the outer surface of said component.

3. The combination in an airplane of a flexible air-impervious fuselage having an elongated shape substantially round in cross section, a flexible liquid-impervious fully enclosed collapsible-type container for fuel and contoured to and secured to the bottom of the inside of the fuselage, air under pressure in the fuselage, and a conduit extending from the outside of the fuselage through the fuselage and connected to the interior of the container, said conduit including a perforated hose portion extending over a major portion of the bottom of the container.

References Cited in the file of this patent
UNITED STATES PATENTS

| | | |
|---|---|---|
| 1,609,497 | Schoettel | Dec. 7, 1926 |
| 2,616,509 | Thomas | Nov. 4, 1952 |
| 2,623,721 | Harrington | Dec. 30, 1952 |
| 2,736,356 | Bender et al. | Feb. 28, 1956 |

FOREIGN PATENTS

| | | |
|---|---|---|
| 28,704 | Great Britain | 1911 |
| 250,264 | Switzerland | June 1, 1948 |